Jan. 26, 1954 R. H. DUFF ET AL 2,667,230
POWER PLANT ARRANGEMENT FOR SERVICING
FROM OUTSIDE FRONT ENDS OF VEHICLES
Filed Sept. 1, 1948 5 Sheets-Sheet 1

INVENTORS.
Robert H. Duff.
Rex A. Terry.
BY
Harness and Harris
ATTORNEYS.

Fig. 4.

Jan. 26, 1954         R. H. DUFF ET AL         2,667,230
          POWER PLANT ARRANGEMENT FOR SERVICING
Filed Sept. 1, 1948  FROM OUTSIDE FRONT ENDS OF VEHICLES
                                          5 Sheets-Sheet 4

INVENTORS.
Robert H. Duff
Rex H. Terry
BY
Harness and Harris
ATTORNEYS.

Patented Jan. 26, 1954

2,667,230

UNITED STATES PATENT OFFICE 2,667,230

POWER PLANT ARRANGEMENT FOR SERVICING FROM OUTSIDE FRONT ENDS OF VEHICLES

Robert H. Duff, Detroit, and Rex A. Terry, Berkley, Mich., assignors to Chrysler Corporation, Highland Park, Mich., a corporation of Delaware Application September 1, 1948, Serial No. 47,213

12 Claims. (Cl. 180—64)

This invention relates to motor vehicles and particularly to an improved power plant arrangement for commercial vehicles of the short haul or door-to-door delivery type whereby the operation of the vehicle is simplified, the load carrying capacity of the vehicle increased and used to best advantage, and the operation and maintenance of the power plant facilitated and materially simplified.

It is a primary object of this invention to provide a construction whereby the complete power plant unit may be mounted within the front end of the vehicle body in such a manner that it may be completely maintained and serviced from outside the front end of the vehicle.

It is another object of this invention to provide for the mounting of the vehicle power plant in the front end of a vehicle body in such a manner that the driver's compartment is spacious and readily accessible from either side of the vehicle; the transverse passageway through the vehicle not being obstructed by a drive shaft tunnel, a rearwardly extending engine housing, or the like.

It is a further object of this invention to provide a motor vehicle construction whereby the complete power plant unit may be readily disconnected and dismounted from the vehicle and another substituted therefor with a minimum of time and effort, the operation requiring a minimum amount of equipment and labor.

It is a further object of this invention to provide a construction of this class in which the radiator, clutch mechanism and transmission mechanism are readily removable from the chassis frame along with the engine unit so that primarily only one main connection is required between the removable power plant unit and the drive transmitting unit, other than the means actually securing the power plant in position, this one connection being that between the transmission output shaft and the vehicle propeller or drive shaft.

It is another object of this invention to provide an improved and simplified motor vehicle engine mounting that permits the engine unit to be slidably removed from the forward end of the chassis frame as a result of the chassis frame being arranged to provide a support as well as a trackway for certain of the engine support brackets.

It is a further object of this invention to construct the vehicle power plant compartment such that individual engine and fuel sections are provided at the forward end of the vehicle, the arrangement being such that an increased air flow through the engine radiator and engine compartment is obtainable as a result of a baffle plate construction associated with the hinged cover for the power plant compartment.

Fig. 3 is a fragmentary perspective view of the front end of the motor vehicle, the power plant compartment cover being shown in raised position and the detachable body panel at the lower portion of the front end of the body removed;

In the drawings 10 represents as an entirety a closed motor vehicle body that is mounted on a chassis frame 11 which in turn is mounted on front and rear road wheels 12 and 13 respectively. The body 10 includes a forward power plant compartment 14, a transversely extending through passageway 15 accessible from either side of the vehicle through the jackknife side doors 16, and a main load carrying compartment 17 that may be entered from either the through passageway 15 or through the hingedly mounted rear doors 18. Mounted in the through passageway 15 is a driver's seat 19 of conventional design, the seat 19 being adapted to be shifted either horizontally or vertically relative to its mounting post 20 as well as rotatable about the post mounting. Conveniently accessible from the driver's seat 19 are the steering wheel 21, the transmission gear shift lever 22, the door operating handles 23 and the other control elements necessary for the operation of the vehicle.

The forward portion of the chassis frame 11 (see Figs. 4–6) extends beneath the lower portion of the engine compartment 14 and comprises the channel-shaped, spaced apart, longitudinally extending, main side frame members 31 and 32, the transversely extending, cross frame members 33 and 34 interconnecting the side frame members 31 and 32, and the longitudinally extending, auxiliary frame member 39. Cross frame member 34 is a two-piece frame unit comprising the sections 35 and 36 which are detachably connected together by the bolts 37 or other suitable connecting means. The outer end portions of the cross frame sections 35 and 36 are detachably connected to the forward end portions of the side frame members 31 and 32 by the bolts 38 and 41 respectively.

Figure 1:
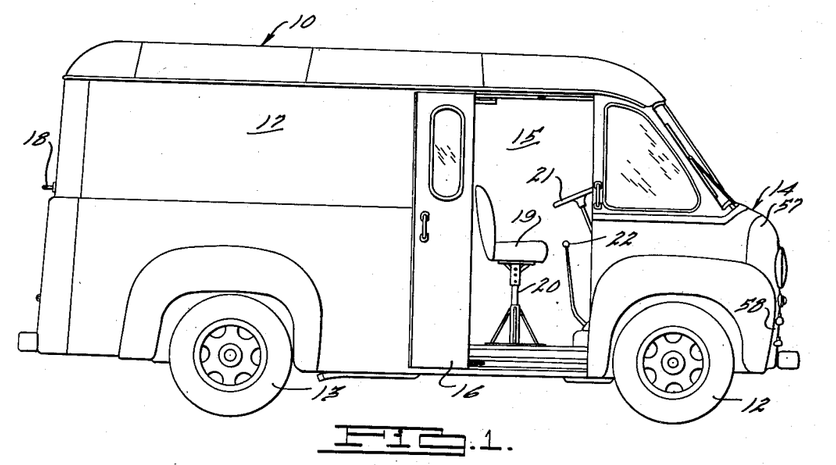
Fig. 1 is a side elevation of a motor vehicle embodying this invention, the side doors being shown in open position to disclose the transverse passageway through the truck.
Figure 2:
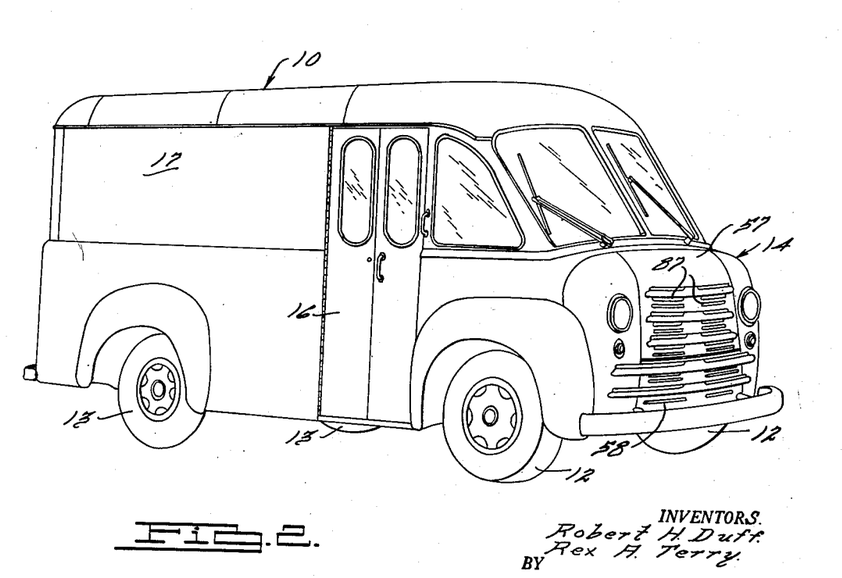
Fig. 2 is a perspective view of the vehicle shown in Fig. 1 with the side doors shown in closed position.
Figure 4:
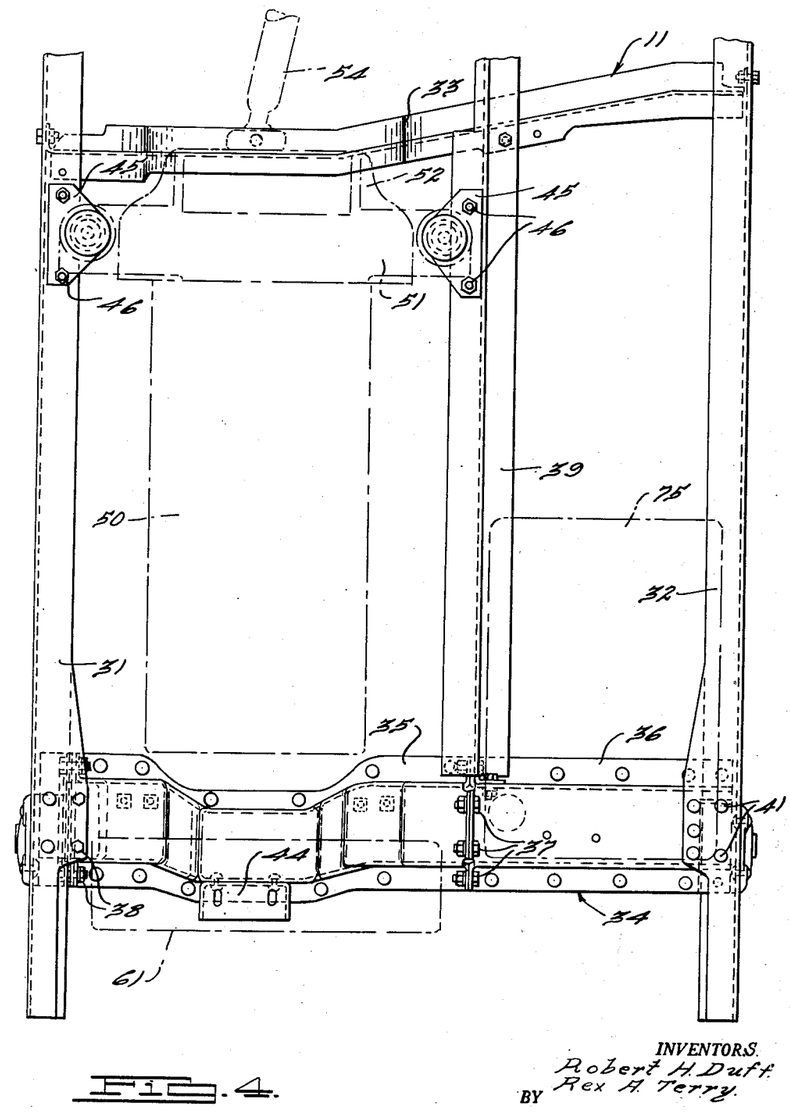
Fig. 4 is a plan view of the forward end portion of the vehicle chassis frame, with the radiator, engine, and transmission and clutch unit associated with this portion of the chassis frame shown outlined in dashed lines.
Figure 5:
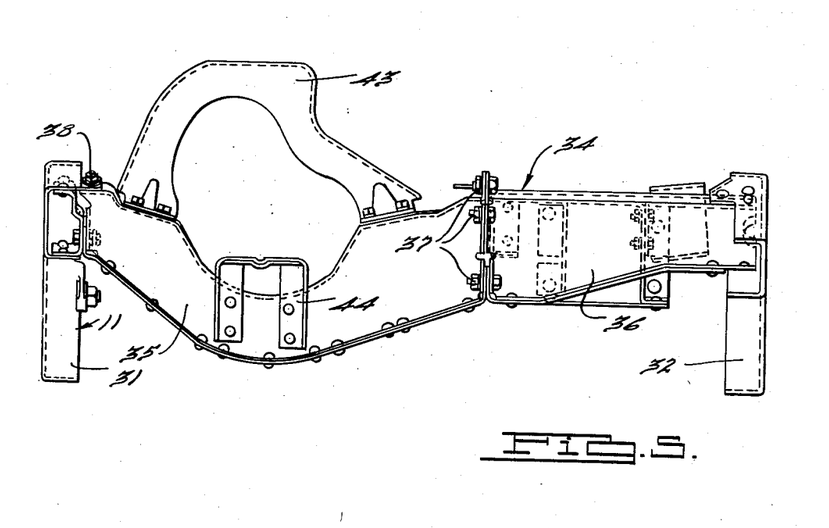
Fig. 5 is an elevation of the front end of the chassis frame including the front engine support bracket and the radiator support bracket.
Figure 6:
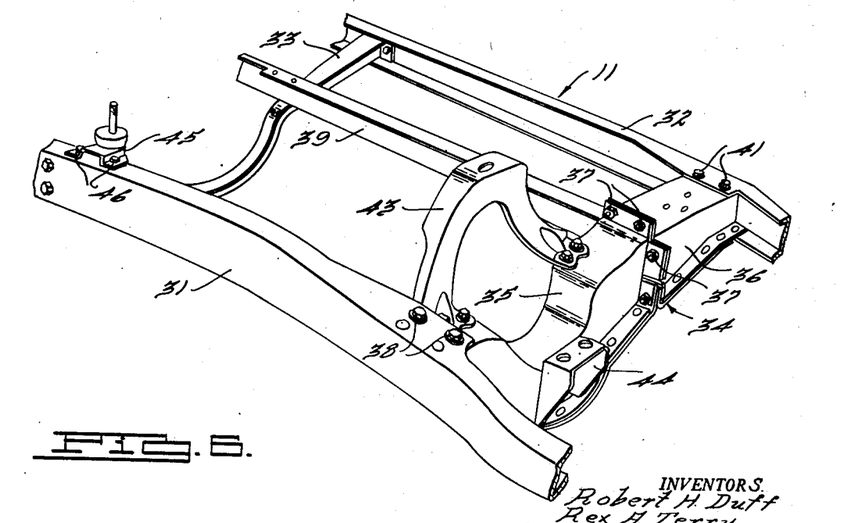
Fig. 6 is a fragmentary perspective view of the forward portion of the chassis frame including the forward and rear engine supports and the radiator support.

Cross frame section 35 has detachably mounted thereon the upwardly arched forward engine support bracket 43 and the radiator support bracket 44. Side frame member 31 and auxiliary frame member 39 have the rear engine support brackets 45 detachably mounted thereon by means of the bolts 46. The rear engine support brackets 45 are seated upon the top surface of the side rails 31 and 39 in such a manner that they may be shifted along the rails 31 and 39 when the bolts 46 are disconnected from the side rails and the forward cross frame section 35 released from its supports. The engine support brackets 43 and 45 cooperate to provide a three-point suspension for the engine 50 mounted thereon.

It is thought to be obvious how the engine 50, with the attached clutch unit 51 and transmission unit 52, may be quickly and readily removed from the front end of the engine compartment 14. The engine 50 with the attached radiator, clutch and transmission devices may be considered the engine unit of the vehicle. To replace or repair an engine unit mounted in a motor vehicle in the manner herein disclosed it is merely necessary to open the hood 57, remove the demountable lower front end body panel 58, unbolt the connections of the cross frame section 35 to the side frame 31 and the cross frame section 36, unbolt the rear engine support brackets 45 and disconnect the output shaft of the transmission 52 from the propeller or drive shaft 54. It is understood that the various control linkages between the clutch, carburetor and the like, as well as the electrical system, have already been disconnected at this point. With the drive shaft 54 free of the transmission 52, the cross frame section 35 free of its supports, and the rear engine support brackets 45 unbolted from the frame members 31 and 39 respectively, the complete engine unit along with the radiator, clutch and transmission devices may be slidably moved forwardly through the opening in the front end of the engine compartment. During this forward movement of the engine unit the brackets 45 slide along the rails 31 and 39 which form appropriate trackways for the engine support brackets 45 mounted thereon. Any conventional hoist mechanism can be connected to the forward portion of the engine unit from outside the front end of the vehicle to support the engine unit during its removal from the chassis. It will be noted that by the construction herein disclosed all work required for the removal from the chassis. It will be noted that by the construction herein disclosed all work required for the removal of the engine unit may be accomplished from outside the front end of the vehicle body. In order to remove the engine unit from the vehicle it is not necessary to lift the engine unit through the interior of the body and no special hoists or work pits are required. The specific form of body and frame arrangement herein disclosed provides a simplified, low cost, easily serviced vehicle construction that is particularly adapted for motor vehicle fleets that require periodic maintenance and service operations that may necessitate the removal from the chassis frame of the engine and/or transmission, clutch and associated units. Vehicles constructed in accordance with this invention may be parked in their usual location in a garage or parking lot when in need of service and the maintenance mechanic can remove the engine unit from the front of the vehicle and replace it with a reconditioned or new unit by a relatively simple operation. The vehicle need not be sent to a service garage or service pit in order to effect engine repairs and the mechanic is not required to work within the relatively small, confining space within the vehicle body in order to effect repairs. As a result of the freedom of movement afforded the maintenance mechanic by virtue of this arrangement, maintenance and service operation are expedited and the vehicle is usable a greater percentage of the time.

It is also possible to remove the fuel tank 75 from the chassis frame 11 through the opening in the front end of the vehicle body. The fuel tank 75 may be independently disconnected from its supporting cross member section 36 and removed through the hood opening or the cross member section 36 may be detached from the side rail 32 and removed from the chassis frame along with the cross member section 35 during removal of the engine unit. Frame section 36 may also be removed independently of the section 35. It is obvious that the chassis frame construction herein disclosed provides an extremely flexible arrangement to accomplish the various service and maintenance jobs that may be required in a motor vehicle of this type. By disconnecting both sections of the cross frame member 34 from the supporting side rails 31 and 32 it is possible to quickly and easily remove the entire power plant from the chassis frame while working in a single location outside of the vehicle body.

Not only is it possible to readily remove the complete power plant unit from the chassis frame, through the opening in the front end of the vehicle body, but in addition, the power plant is so arranged that all daily service check-ups of the plant may be accomplished from outside the front end of the vehicle. The offset mounting of the engine unit relative to the longitudinal centerline of the chassis frame 11 positions the engine 50 and its radiator 61 on the left hand or curb side of the vehicle when looking rearwardly from the front end of the vehicle. The fill pipe 62 for the radiator 61 projects forwardly from the upper portion of the radiator and is accordingly readily accessible for check and refill of the radiator whenever the engine hood 57 is in open or raised position. The radiator drain cock 63 is also located at the lower front end of the radiator adjacent the hood opening so that it may be easily reached from the front end of the vehicle.

Projecting from the inboard side of the engine unit, adjacent the front end thereof, are the engine crankcase oil fill pipe 65 and the engine crankcase oil level check stick 66. These service check-up elements are also located such that they project into the front of the opening to the power plant compartment where they may be easily reached from the front end of the vehicle when the hood 57 is open.

A vertical, longitudinally extending, insulating wall or partition 71 is mounted adjacent the inboard side of the engine so as to divide the engine compartment 14 into two sections, the engine section 72 and the fuel section 73. Wall 71 acts as a fire wall to insulate the fuel section from the engine section and it also cooperates with the louver arrangement of the hood 57 to direct the inflow of air from the hood louvers through the cooling core structure of the radiator 61 as will be subsequently explained in detail.

A fuel tank 75 is mounted in the fuel section 73 with the fuel tank fill pipe 76 positioned at the front of the upper forward end portion of the tank to permit filling of the tank from the front end of the vehicle when the hood 57 is raised to open position. The fuel line 77, connecting the tank to the engine, is detachably coupled to the fuel tank at 78 so that the line 77 may be readily disconnected and blown out in the event it becomes clogged with foreign matter. The fuel tank gauge mechanism 79 is mounted in the top of tank 75 where it may be easily reached from the front of the vehicle if it requires attention.

Removably mounted in the upper portion of each of the power plant compartment sections 72 and 73 is a windshield wiper unit 80. Replacement of either of these units or repair of these wiper units may be readily accomplished from outside the front end of the vehicle when the hood 57 is open. Also removably mounted in the fuel section 73 is the heater blower motor and fan 81 for the windshield defrosting equipment. Hoses 82, connected to blower 81, extend to each of the panels of the windshield. It will be seen that the particular arrangement herein disclosed permits all normal servicing of the motor vehicle, such as checking and replacing the oil, water and fuel, as well as the heater and windshield wiper equipment, from outside the forward end of the vehicle power plant compartment.

Hood 57 and demountable body panel 58 constitute the closure means for the opening to the power plant compartment. Hood 57 is hingedly mounted on the power plant compartment 14 by means of the spring balanced hinges 85 which permit the hood 57 to be easily raised to an open position to uncover the front end of the entire power plant compartment. Suitable lock means are provided to retain hood 57 in closed position. Hood 57 and panel 58 each include transversely extending louver slots 87 that permit air to flow through the front end of the vehicle body and across the core of the radiator 61 to assist in cooling of the engine. As the engine unit is offset relative to the longitudinal centerline of the vehicle chassis frame, it is obvious that the air passing through the louvers on the side of the power plant compartment in front of the fuel section 73 would ordinarily pass rearwardly and have no contact with the core of radiator 61 located on the other side of the chassis frame in the front of the engine section 72. To obtain an increased cooling effect and to reduce the amount of air flowing through the fuel section a baffle plate 88 (see Fig. 3) has been mounted on the inner side of the hood 57 behind the louver openings to cover the front end of the fuel section 73. Baffle plate 88 slopes inwardly and rearwardly towards the inboard side of the engine when hood 57 is closed and is adapted to have its inboard vertical edge positioned adjacent the forward edge of the insulating wall 71 when the hood 57 is in closed position. As a result of this baffle plate construction an increased amount of air is directed across the core of radiator 61 when the vehicle is moving forwardly which air materially increases the radiator cooling effect. In addition to directing additional air through the engine radiator the baffle plate 88 reduces the interior heater load due to the fact that it prevents the cool air passing through the hood louvres on the fuel section side of the power plant compartment from passing up around the heater blower 81 and cooling off the hot air being forced into the defroster hoses 82 by the blower unit. Also as a result of the baffle plate construction an increased air flow is directed through the radiator and across the engine unit to carry away any noxious gases that may be generated by the engine unit. This force draft effect, created during forward motion of the vehicle, prevents the hot air and noxious gases, that may be generated by the engine units, from seeping into the fuel section of the power plant compartment and up into the vehicle operator's compartment located above and behind the fuel section 73.

Figure 7:
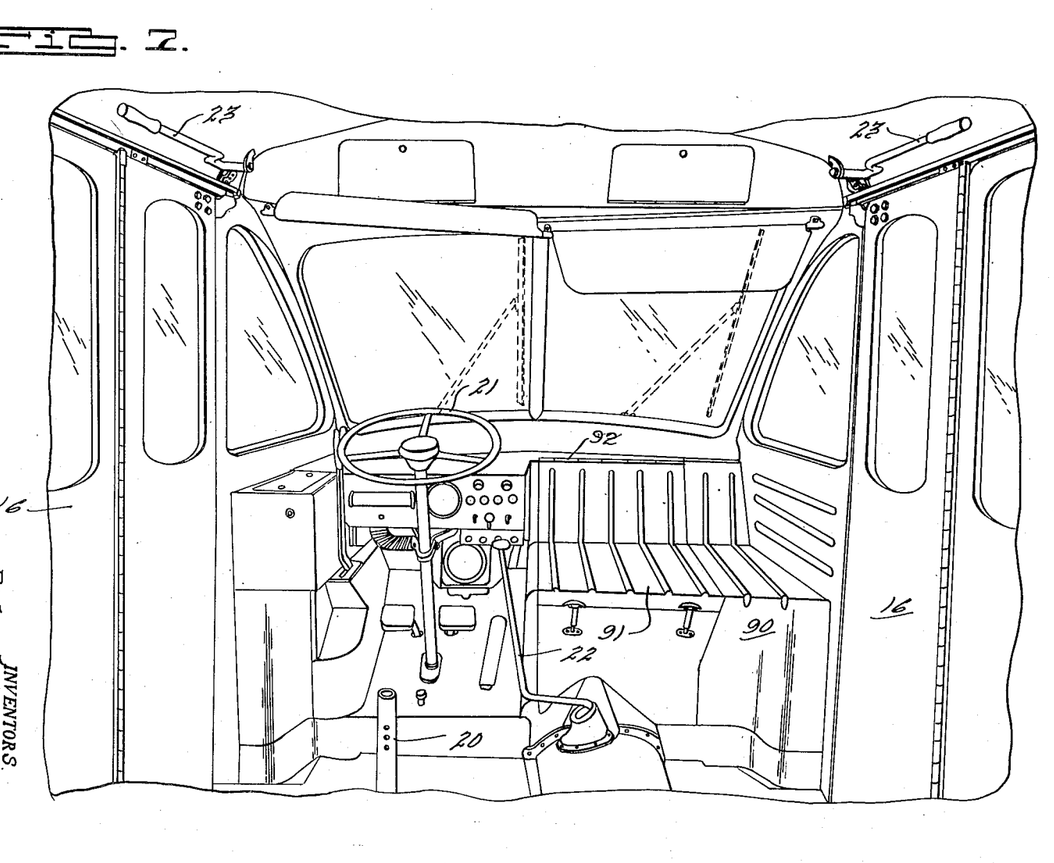
Fig. 7 is a fragmentary perspective view of the interior of the front end portion of the vehicle.

Fig. 7 is a fragmentary perspective view of the forward interior portion of the vehicle body. Due to the offset arrangement of the engine unit the forward portion of the vehicle body above the fuel section of the power plant compartment is materially enlarged to provide a vehicle operator's control compartment such that the vehicle controls may be placed forwardly of passageway 15 to such an extent that the transverse passageway between the side doors is substantially clear of all obstructions other than the driver's seat which may be easily mounted from either side of the truck. As the seat 19 is free to rotate about its support post 20, the driver may easily dismount and leave from either side of the truck or pass into the rear load carrying compartment of the truck by simply turning the seat about its support.

The engine section 72 of the power plant compartment 14 includes the engine housing 90 which extends rearwardly into the interior of the vehicle body. The housing 90 provides a suitable support for such things as refrigerator chests, sales baskets, jumper seats, and the like.

The top portion 91 of engine housing 90 is hingedly mounted at 92 on the housing to permit it to be raised for ready inspection of the engine unit from within the vehicle. This arrangement permits the driver to readily inspect the engine without dismounting from the truck. Such things as the carburetor and ignition systems may be completely repaired from within the truck without exposing either the repairman or the engine unit to the elements.

The jackknife side doors 16 are operated by the overhead handles 23 located adjacent the upper inner front corners of the side door openings. The handles 23 actuate a door control mechanism which is shown in detail in application, Serial No. 60,924 of Rex A. Terry et al. filed November 19, 1948. Handles 23 need merely to be pulled downwardly and they will either open or close the doors and then automatically return to their normal, elevated positions extending rearwardly along the roof rails of the door openings. By this arrangement the handles are conveniently accessible to the driver yet located in positions which will not impede quick, easy, movement through the transversely extending through passageway 15 between the side doors.

What is claimed is:

1. A motor vehicle including a body having a power plant compartment extending across the front end thereof, an opening to said compartment from the front of said body, a removable closure member for said opening, a chassis frame supporting said body and including portions extending beneath said compartment comprising spaced apart, longitudinally extending, side rails, a longitudinally extending auxiliary rail mounted between said side rails at the front end of said chassis frame, and a transversely extending cross frame detachably connected between said rails at the front end of said chassis frame, said cross frame consisting of a plurality of detachably connected sections, an engine unit provided with a pair of rear support brackets one of which is detachably mounted on one of said side rails and the other detachably mounted on said auxiliary rail, each of said rear support brackets being arranged for slidable movement along its supporting rail, a front engine support bracket mounted on one of the sections of said cross frame, a radiator mounted in front of said engine unit and supported on a section of said cross frame, a fuel tank mounted on another of said cross frame sections, said engine, radiator and fuel tank being so constructed and arranged with respect to said opening that the servicing and maintenance thereof may be accomplished from outside the front end of the vehicle.

2. A motor vehicle including a body having a forwardly opening power plant compartment in the front end thereof, a chassis frame supporting said body and extending beneath said compartment comprising spaced apart, longitudinally extending side rails, a longitudinally extending auxiliary rail mounted between said side rails at the front end of said chassis frame, and a transversely extending cross frame member detachably connected between said rails at the front end of said chassis frame, said cross frame member consisting of a plurality of detachably connected sections, an engine unit provided with a pair of rear support brackets one of which is detachably mounted on one of said side rails and the other on said auxiliary rail, said rear support brackets being adapted to be slidably shifted along the rails on which they are mounted, and a front engine support bracket mounted on one of the sections of said cross frame member, a radiator mounted on said last-mentioned section of said cross frame member in front of said engine unit, a fuel tank mounted on another of the sections of said cross frame member, a longitudinally extending compartment wall mounted between said engine unit and said fuel tank to divide said compartment into separate engine and fuel sections, and a louvered hood for said body compartment opening, said hood including baffle means to direct the air passing through said hood in front of said fuel section into said engine section.

3. A motor vehicle including a body having a forwardly opening power plant compartment in the front end thereof, a chassis frame supporting said body and extending beneath said compartment comprising a plurality of spaced apart, longitudinally extending rails, and a transversely extending cross frame member detachably connected between said rails at the front end of said chassis frame, a laterally offset engine unit provided with a pair of rear support brackets detachably supported between a pair of said rails and arranged for slidable movement therealong, and a front engine support bracket mounted on said cross frame member, a radiator mounted on said cross frame member in front of said engine unit, a laterally offset fuel tank mounted on said cross frame member so as to extend longitudinally of said chassis frame adjacent and parallel to said engine, and a movable louvered cover for said power plant compartment opening, the engine, radiator and fuel tank units of the power plant being so constructed and arranged across the front end of said compartment that servicing and maintenance thereof may be readily accomplished from outside the front end of the vehicle.

4. A power plant framework for a motor vehicle comprising a pair of laterally spaced, longitudinally extending side rails, a first cross frame member extending transversely to said side rails and connected at its end portions to said side rails at points spaced inwardly from the ends of said side rails, a second cross frame member extending transversely to said side rails comprising a plurality of detachably connected sections, the end portions of said second cross frame member being detachably connected to said side rails at points adjacent the ends of said side rails, a longitudinally extending auxiliary rail positioned between said rails and connected at its end portions to each of said cross frame members, the connection of the end of the auxiliary rail to said second cross frame member being made at the connection between a pair of the detachably connected sections of said second cross frame member, an engine rear support bracket detachably mounted on said auxiliary rail, an engine rear support bracket detachably mounted on one of said side rails, and an engine front support bracket carried by one of the sections of said second cross frame member, said auxiliary rail and the side rail mounting the engine rear support bracket providing trackways for slidably supporting the engine rear support brackets mounted thereon when said rear support brackets have been disconnected from the supporting rails and the section of the second cross frame member carrying the engine support bracket has been disconnected from its supports.

5. In a motor vehicle the combination of a vehicle body having a forwardly opening power plant compartment at the front end thereof, said compartment including separable longitudinally extending, engine and fuel sections, a chassis frame supporting said body and extending beneath said compartment comprising a plurality of longitudinally extending, spaced apart rail members connected together at their forward end portions by a transversely extending, cross frame member, a longitudinally extending engine unit including engine crankcase check and fill pipes and a forwardly facing radiator mounted on said chassis frame and positioned within said engine section, the radiator and engine crankcase check and fill pipes projecting forwardly to the front of said power plant compartment opening, a longitudinally extending fuel tank including a fill pipe mounted within said fuel section, the fill pipe for said tank projecting forwardly to the front of said power plant compartment opening, and closure means for the opening to said power plant, the arrangement being such that normal servicing of the power plant may be accomplished from outside the forward end of the vehicle when said closure means has been moved to a position to uncover the opening to the power plant compartment.

6. In a motor vehicle the combination of a vehicle body having a forwardly opening power plant compartment at the front end thereof, said compartment including separate longitudinally extending, engine and fuel sections, a chassis frame supporting said body and extending beneath said compartment comprising a plurality of longitudinally extending, spaced apart, rail members connected together at their forward end portions by a transversely extending cross frame member, an engine unit including a forwardly facing radiator mounted on said chassis frame and positioned within said engine section, a dividing wall extending between said engine and fuel sections, a longitudinally extending fuel tank mounted within said fuel section, louvered closure means for the opening to said power plant compartment, and baffle plate means mounted on the inner side of said closure means adapted to divert the air passing through the openings in said closure means in front of said fuel section into the engine section.

7. A motor vehicle including a closed body having a forwardly opening power plant compartment in the front end thereof, a chassis frame supporting said body and extending beneath said compartment comprising spaced apart, longitudinally extending side rails, a longitudinally extending auxiliary rail mounted between said side rails at the front end of said chassis frame, and a transversely extending cross frame member detachably connected between said rails at the front end of said frame, said cross frame member consisting of a plurality of detachably connected sections, a longitudinally extending engine unit bridgingly supported between a pair of said rails at one side of said compartment and anchored to one of the removable sections of said cross frame member, an engine radiator mounted on one of the sections of said cross frame member so as to extend transversely across the front end of said engine unit, a fuel tank mounted on another of the sections of said cross frame member so as to extend longitudinally of the chassis frame along the other side of said compartment, a longitudinally extending wall mounted between said engine unit and said fuel tank so as to form separate engine and fuel sections in said power plant compartment, a louvered closure means for the front opening to said power plant compartment, and an engine unit housing forming portions of the rear walls of said power plant compartment arranged to project into the interior of the vehicle body, said engine unit housing including a movable wall portion shiftable to permit inspection and servicing of said engine unit from within said vehicle body.

8. A motor vehicle including a closed body having a forwardly opening power plant compartment in the front end thereof, a chassis frame supporting said body and extending beneath said compartment comprising spaced apart, longitudinally extending side rails, a longitudinally extending auxiliary rail mounted between said side rails at the front end of said chassis frame, and a transversely extending cross frame member detachably connected between said rails at the front end of said frame, said cross frame member carrying a complete power plant unit and consisting of a plurality of detachably connected sections, a longitudinally extending engine unit bridgingly supported between a pair of said rails at one side of said compartment and anchored to one of the removable sections of said cross frame member, an engine radiator mounted on one of the sections of said cross frame member so as to extend across the forward end of said engine unit, a fuel tank mounted on another of the sections of said cross frame member so as to extend longitudinally of the chassis frame adjacent said engine unit, a longitudinally extending wall mounted between said engine unit and said fuel tank to divide said power plant compartment into engine and fuel sections, and louvered closure means for the opening to said power plant compartment, said closure means including baffle means whereby all air passing through the louvers thereof is directed through the engine section of said power plant compartment, the arrangement of the power plant unit on said chassis frame permitting the power plant to be unobstructedly shifted forwardly through the opening to said power plant for demounting purposes.

9. A closed body motor vehicle having a forwardly opening power plant compartment extending across the lower portion of the front end thereof said compartment including a longitudinally extending engine section adjacent one side of the vehicle, a longitudinally extending fuel storage section adjacent the other side of the vehicle, a vertically positioned, longitudinally extending wall separating said engine and fuel sections, and closure means for the opening to said compartment comprising a hingedly mounted, louvered hood unit mounted across the opening to said compartment, said louvered hood having baffle means associated therewith such that all air passing through the louvered hood is directed through the engine section.

10. In a motor vehicle the combination of a vehicle body having a forwardly opening power plant compartment at the front end thereof, said compartment including separate, adjacently positioned, longitudinally extending, engine and fuel sections, a chassis frame supporting said body and having portions thereof extending beneath said compartment, an engine unit including a forwardly facing radiator mounted on said chassis frame and positioned within said engine section, a dividing wall extending between said engine and fuel sections, a heat circulating mechanism and a fuel tank mounted within said fuel section, louvered closure means for the opening to said power plant compartment, and baffle plate means mounted on the inner side of said closure means adapted to deflect the air passing through the louver openings in said closure means located in front of said fuel section to redirect this air into the engine section.

11. A motor vehicle including a body having a power plant compartment extending across the front end thereof, an opening to said compartment from the front of the body, said opening having a removable closure member therefore, a chassis frame supporting said body and having portions extending beneath said compartment comprising spaced apart, longitudinally extending, side rails, a longitudinally extending auxiliary rail mounted between said side rails at the front end of said chassis frame by means of side rail supported, transversely disposed, cross frames, one of said transversely extending cross frames being detachably connected between said rails at the front end of said chassis frame, said one cross frame consisting of a plurality of detachably connected sections, an engine unit provided with a pair of rear engine support brackets one of which is detachably mounted on one of said side rails and the other detachably mounted on said auxiliary rail, each of said rear support brackets being arranged for slidable movement along its supporting rail, a front engine support bracket mounted on one of the sections of said one cross frame, a radiator mounted in front of said engine unit and supported on said one section of said cross frame, and a fuel tank mounted on another of said cross frame sections so as to be conveniently arranged adjacent said engine unit.

12. In a motor vehicle having a body with a transversely extending interior passageway connecting opposite sides of the body adjacent to but spaced rearwardly of the front end thereof, a power plant compartment extending across the body between the front end thereof and said passageway having a service opening across the front end thereof, said compartment having a removable closure for said service opening, an engine unit located in said power plant compartment adjacent one side thereof, compartment wall portions separating said engine from the interior of said body including a wall portion movably mounted on and located within the body interior and arranged to provide a load support portion forwardly of said passageway as well as a means to readily permit inspection of the engine unit from the interior of the vehicle body, a fuel tank unit mounted in the front end of said power plant compartment adjacent the other side thereof, said fuel tank having a fill pipe portion located at the front end of the engine compartment and readily accessible through the service opening when the closure therefor is removed, and body wall portions separating said fuel tank from the interior of said body and from said engine and providing a well forwardly of said passageway and adjacent said load support mounting control elements for the motor vehicle.

ROBERT H. DUFF.
REX A. TERRY.

References Cited in the file of this patent

UNITED STATES PATENTS

| Number | Name | Date |
|---|---|---|
| 1,433,257 | Brooks | Oct. 24, 1922 |
| 1,475,331 | Wales | Nov. 27, 1923 |
| 1,565,624 | Chilton | Dec. 15, 1925 |
| 1,606,966 | Smith-Clarke | Nov. 16, 1926 |
| 1,613,683 | Utz | Jan. 11, 1927 |
| 1,679,990 | Schjolin | Aug. 7, 1928 |
| 1,754,086 | Feilcke | Apr. 8, 1930 |
| 1,770,279 | Morrison | July 8, 1930 |
| 1,906,404 | Page | May 2, 1933 |
| 2,095,058 | Cross | Oct. 5, 1937 |
| 2,116,666 | Carlson | May 10, 1938 |
| 2,151,229 | Piroumoff et al. | Mar. 21, 1939 |
| 2,172,831 | Carlson | Sept. 12, 1939 |
| 2,191,599 | Valletta | Feb. 27, 1940 |
| 2,246,824 | Wheat | June 24, 1941 |
| 2,298,773 | Nicol | Oct. 13, 1942 |
| 2,383,611 | Marcy | Aug. 28, 1945 |
| 2,480,047 | Reinhard | Aug. 23, 1949 |

FOREIGN PATENTS

| Number | Country | Date |
|---|---|---|
| 21,386 | Great Britain | Apr. 21, 1910 |
| 179,756 | Great Britain | May 18, 1922 |
| 459,450 | Great Britain | Jan. 5, 1937 |
| 553,185 | Great Britain | May 11, 1943 |
| 600,755 | Great Britain | Apr. 19, 1948 |